May 23, 1944. W. C. JOHNSON 2,349,791
HYDRAULIC BRAKE SYSTEM
Filed June 28, 1943   3 Sheets-Sheet 1
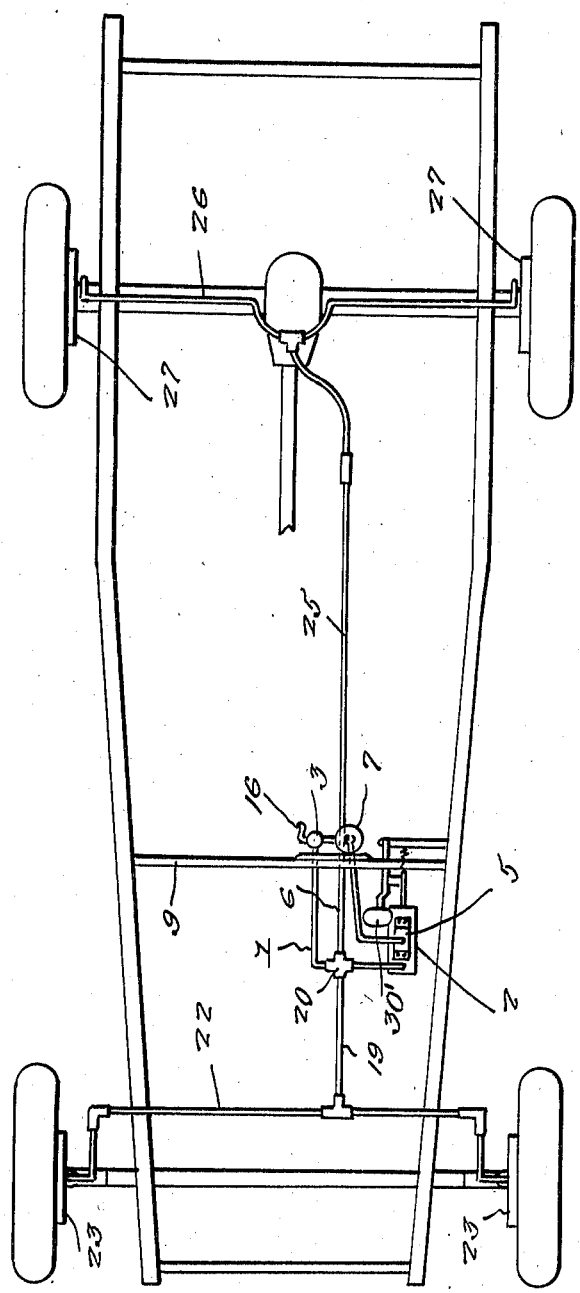
Inventor
Walter C. Johnson
By Clarence A. O'Brien
and Harvey B. Jacobson
Attorneys

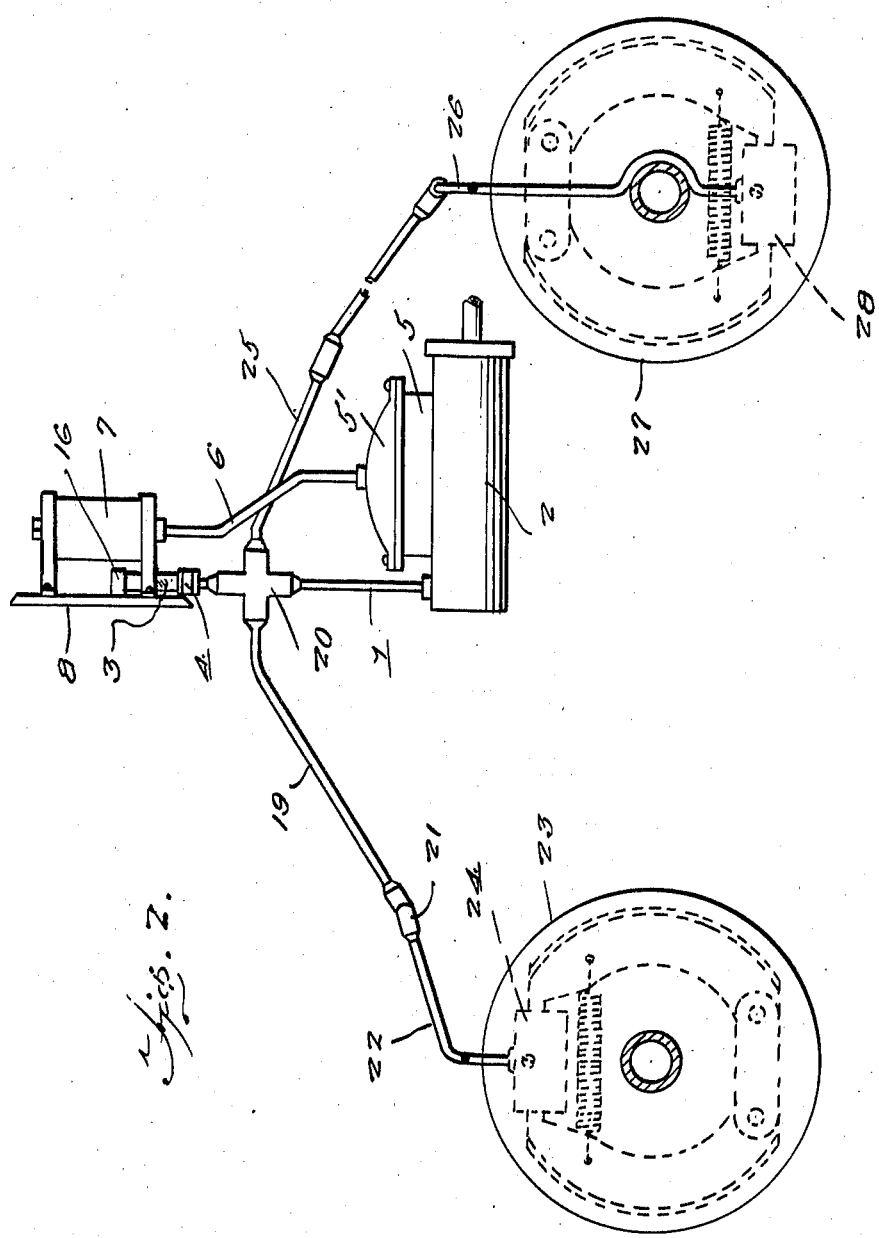

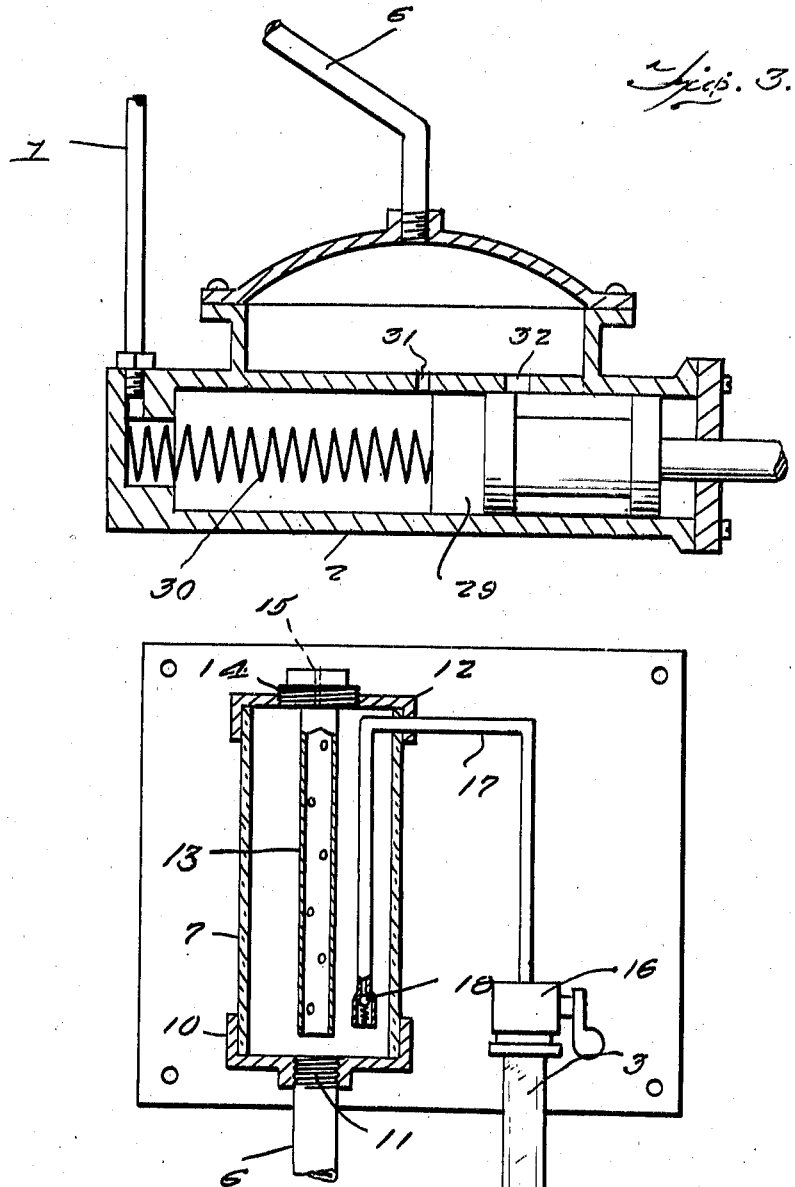

Patented May 23, 1944

2,349,791

UNITED STATES PATENT OFFICE 2,349,791

HYDRAULIC BRAKE SYSTEM

Walter C. Johnson, Bemus Point, N. Y.

Application June 28, 1943, Serial No. 492,604

2 Claims. (Cl. 188—152)

My invention relates to improvements in hydraulic brake systems for the four-wheel brakes of motor vehicles, the principal object in view being to provide a simplified system of the type indicated equipped to obviate the formation of air in the fluid supply chamber of the master cylinder, and for quick bleeding of the entire system, of air, in one operation, in the event that air is present in the system due to negligent servicing of the system or for other reasons.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in top plan of an automobile chassis, running gear, and instrument panel, and illustrating my improved brake system installed, Figure 2 is a view in side elevation of the system installed and with parts shown in section, Figure 3 is a view in longitudinal section of the master cylinder and supply chamber therefor, and Figure 4 is a view in front elevation, partially in section, of the indicating tube and the tell talesight tube, and parts directly associated therewith.

Referring to the drawings by numerals, according to my invention, a fluid pressure line 1 from the usual master cylinder 2 extends vertically from the pressure discharge end thereof to the lower end of an upright tell-tale sight glass tube 3, to which said line 1 is connected by the conventional coupling 4. The usual supply chamber 5 for the master cylinder 2, but, having a dome top 5', is connected at its top by an upright overflow line 6 to the bottom of an upright oil level indicating sight glass tube 7 disposed alongside the tell-tale tube 3. The telltale tube 3 and indicating tube 7 are suitably fixed to a supporting plate 8 adapted to be secured in any desired manner to the instrument panel 9 of the automobile.

The indicating tube 7 is closed at its bottom end by a suitable cap member 10 into which the line 6 is threaded, as at 11, to open into said tube, and said indicating tube 7 is closed at its upper end by a cap member 12 similar to member 10. A perforated air vent tube 13 depends through the member 12 axially of the indicating tube 7 into said tube and terminates short of the cap member 10, said vent tube having an enlarged head 14 threaded into the cap member 12 and provided with a vent duct 15 opening into the atmosphere.

The tell-tale tube 3 is provided at its upper end with a suitable valve 16 closing said end and for establishing, when open, communication between said tube 3 and a right angled bleed pipe 17 extending from the valve 16 through one side of the indicating tube 7 into the latter and then downwardly alongside the air vent tube 13. The lower end of the bleed pipe 17 is equipped with a spring loaded ball check valve 18 therein, for preventing back pressure in said pipe.

A fluid pressure branch line 19 extends forwardly and downwardly from a T coupling 20 interposed in the fluid pressure line 1 and is coupled, as at 21, to a U-shaped, upright yoke line 22, having its ends extended into the front wheel brake drums 23 and suitably connected to the front wheel brake cylinders, one of which is shown in dotted lines at 24 in Figure 2. A second fluid pressure branch line 25 extends downwardly and rearwardly from said coupling 20 and is connected to a second upright yoke 26, similar to yoke 22, and having its ends extended through the rear brake drums 27 and connected to the rear wheel brake cylinders, one of which is shown in dotted lines at 28 in Figure 2.

The master cylinder 2 contains the usual piston 29 adapted to be operated on its compression stroke against a return spring 30 and by means of the usual brake pedal, as at 30', and said cylinder 2 is provided with the usual oil supply and by-pass ports 31, 32 establishing communication between the cylinder 2 and the supply chamber 5.

Referring now to the operation of the described invention, as will be seen, all fluid lines rise to either the indicating tube 7, on the one hand, or to the telltale tube 3 on the other hand, so that if air is present in the system, it will collect in said tubes 3 and 7. With the valve 16 closed, if the system is charged with brake fluid so that the supply chamber 5 is filled and overflows, by way of the overflow line 6, to part way fill the indicating tube 7, and said system is maintained thus charged, no air can form in the supply chamber 5, and hence in the system. However, if, through leakage, or otherwise, the level of braking fluid in the supply chamber 5 falls, or, in other words, said chamber becomes partly filled only, air may form in said chamber and find its way into other parts of the system. In this event, under operation of the piston 29, or in other words use of the brake, the tell-tale tube 3 will indicate the presence of air in the system by air bubbles in the fluid forced into said tell-tale tube. To clear the system of air, the supply chamber is filled to overflow until the fluid rises part way into the indicating tube 7. The valve 16 is then opened and the piston 29 is operated by the brake pedal to force fluid out of the tell-tale tube 3 into the indicating tube 7, by way of the pipe 17, until the tell-tale tube 3 is clear of air bubbles, the air in the fluid in the tube 7 being forced, under the pressure created, out of the fluid and out of the vent tube 13 into the atmosphere. The valve 16 may then be closed and the pedal released.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the appended claims.

What I claim is:

1. In a hydraulic brake system for automobiles having front and rear pairs of brake cylinders, a fluid pressure master cylinder having a pressure discharge end and a fluid supply chamber surmounting the same, an upright sight glass tube vented at its upper end to the atmosphere for the escape of air therefrom, and disposed at a higher level than said chamber, an upright fluid pressure line connecting the top of said chamber to the bottom of said tube to permit overflow of fluid from the chamber into said tube to indicate that said chamber is full, an upright fluid pressure line arising from the discharge end of said master cylinder, branch fluid pressure lines extending laterally from said upright line to the front and rear pairs of brake cylinders, respectively, a tell-tale sight glass tube arising from the upper end of said upright line and into which fluid under pressure may enter to indicate by air bubbles therein the presence of air in said system, and means to establish communication between said tell-tale tube and said first tube at will whereby fluid under pressure in the system may discharge into said first tube and air in the system be vented from said first tube to bleed the system of air.

2. In a hydraulic brake system for automobiles having front and rear pairs of brake cylinders, a fluid pressure master cylinder having a pressure discharge end and a fluid supply chamber surmounting the same, an upright sight glass tube vented at its upper end to the atmosphere for the escape of air therefrom, and disposed at a higher level than said chamber, an upright fluid pressure line connecting the top of said chamber to the bottom of said tube to permit overflow of fluid from the chamber into said tube to indicate that said chamber is full, an upright fluid pressure line arising from the discharge end of said master cylinder, branch fluid pressure lines extending laterally from said upright line to the front and rear pairs of brake cylinders, respectively, a tell-tale sight glass tube arising from the upper end of said upright line and into which fluid under pressure may enter to indicate by air bubbles therein the presence of air in said system, and means to establish communication between said tell-tale tube and said first tube at will whereby fluid under pressure in the system may discharge into said first tube and air in the system vented from said first tube to bleed the system of air, said means comprising a valved pipe extending from the tell-tale tube into said first tube and having a back pressure ball check therein.

WALTER C. JOHNSON.